(12) United States Patent
Smith

(10) Patent No.: US 6,940,908 B1
(45) Date of Patent: Sep. 6, 2005

(54) COMPRESSING VIDEO FRAMES

(75) Inventor: Ronald D. Smith, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 624 days.

(21) Appl. No.: 09/154,816

(22) Filed: Sep. 17, 1998

(51) Int. Cl.[7] ................................................ H04N 7/18

(52) U.S. Cl. .............................. 375/240.19; 375/240.18

(58) Field of Search ....................... 375/240.18, 240.19; 382/240

(56) References Cited

U.S. PATENT DOCUMENTS

| | | | | |
|---|---|---|---|---|
| 6,031,940 A | * | 2/2000 | Chui et al. | 382/240 |
| 6,124,811 A | * | 9/2000 | Acharya et al. | 341/63 |
| 6,134,695 A | * | 10/2000 | Sasaki et al. | 714/752 |

* cited by examiner

*Primary Examiner*—Andy Rao
(74) *Attorney, Agent, or Firm*—Trop, Pruner & Hu, P.C.

(57) ABSTRACT

A method includes generating first difference frames and compressing the first difference frames to form compressed difference frames. The compressed difference frames are decompressed to form decompressed difference frames, and the decompressed difference frames are used in the generation of the first difference frames.

22 Claims, 14 Drawing Sheets

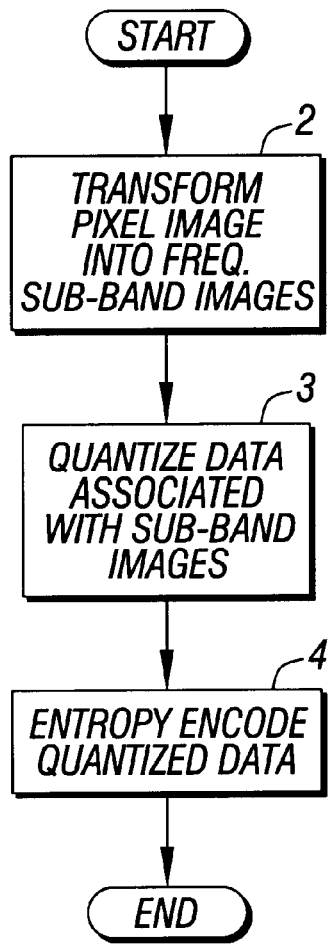
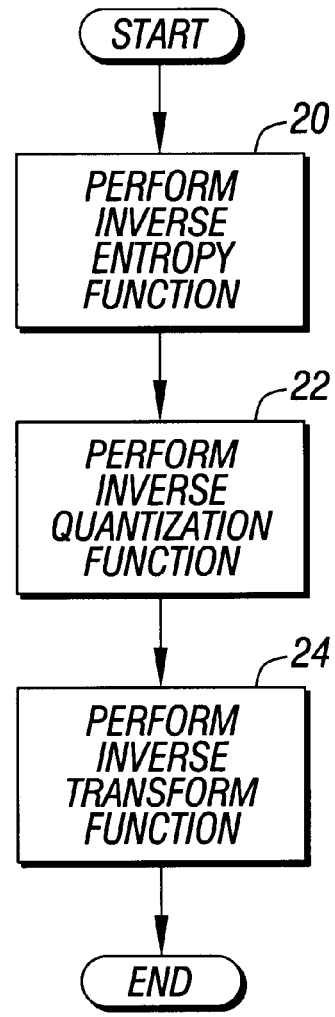
**FIG. 3
(PRIOR ART)**
**FIG. 4
(PRIOR ART)**

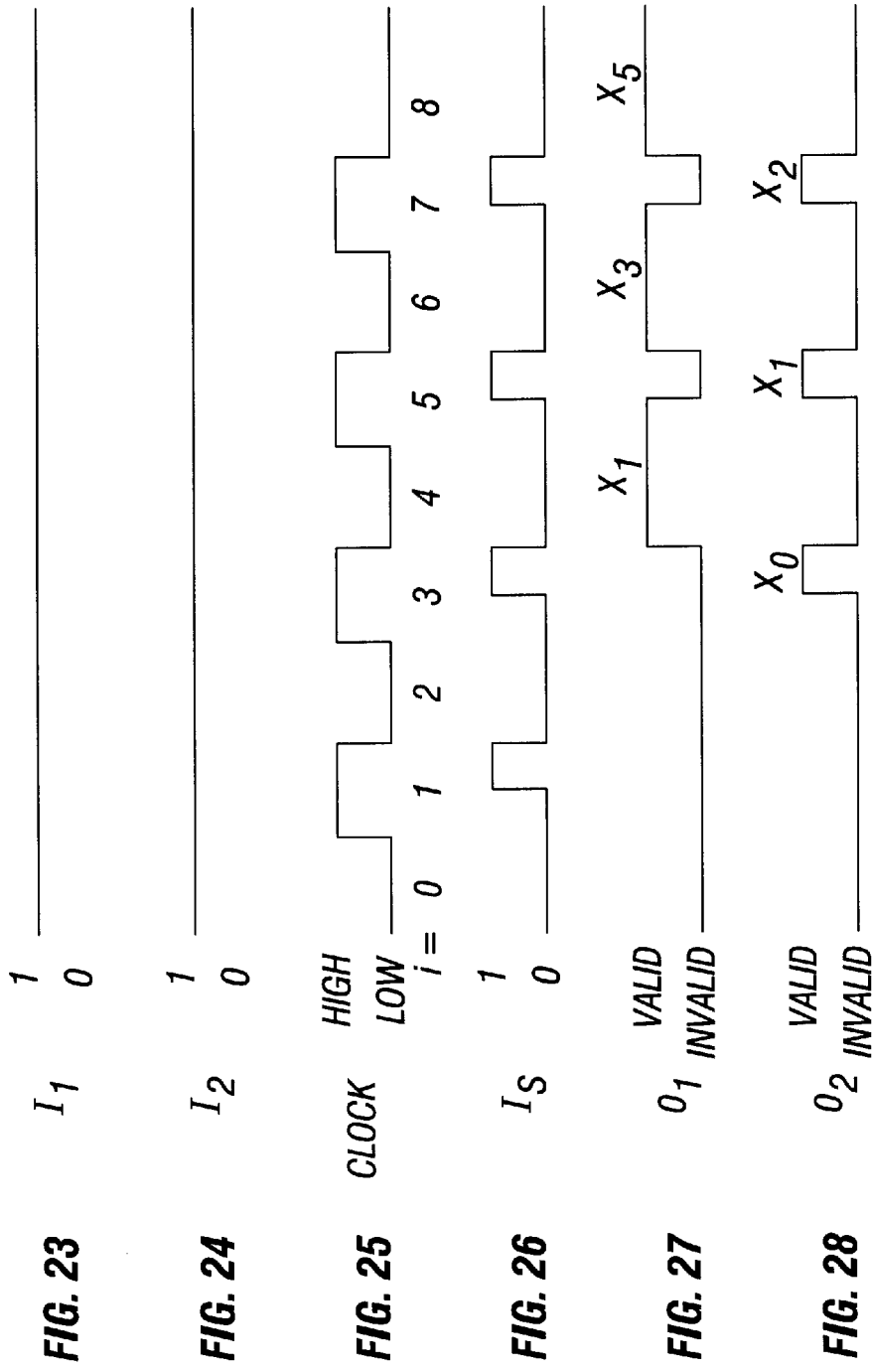

COMPRESSING VIDEO FRAMES

BACKGROUND

The invention relates to compressing video frames.

Referring to FIG. 1, a digital imaging system 5 may include a digital camera 12 that electrically captures a digitized representation, or a pixel image, of an optical image 11. The pixel image typically is represented by a frame of data, and each portion or pixel, of the pixel image is represented by one or more bytes of the frame. Although the camera 12 may transmit the original, decompressed frame to a computer 14 via a bus 15 (a serial bus, for example) the camera 12 might first compress the frame before transmission due to the limited available bandwidth of the bus 15.

As an example of the bandwidth limitations, the bus 15 may be a Universal Serial Bus (USB), and the camera 12 may use an isochronous communication channel of the bus 15 to communicate with the computer 14. However, other devices (an infrared transceiver 16, for example, that communicates with an infrared keyboard 7 and a mouse 8, as examples) may also use the bus 15. Therefore, because multiple devices may use the bus 15, the camera 12 typically does not reserve all of the available bandwidth of the bus 15 but rather, reserves a reasonable portion (a bandwidth of 5 Mbits/sec., for, example) of the available bandwidth. Otherwise, without this self-imposed restriction, the remaining available bandwidth of the bus 15 may be insufficient to support the communications required by the other bus devices.

However, the bandwidth reserved by the camera 12 may be insufficient to transmit decompressed frames. As an example, for video, the camera 12 may transmit thirty frames every second. In this manner, if the camera 12 transmits a frame of 352 columns by 288 rows thirty times every second and represents each pixel by eight bits, then the required bandwidth is 24,330,240 bits/second. Not only does this well exceed the limited bandwidth reserved for the camera 12, this requirement might also exceed the total available bandwidth of the bus 15. Thus, compression might be required to reduce the required bandwidth.

The compression of each frame by the camera 12 may require spatially filtering. In this manner, the pixel intensities of the image typically spatially vary across the image, and the rate at which these intensities vary is called the spatial frequency, which also varies across the image. As an example, the boundaries of objects generally introduce high spatial frequencies because the levels of the pixel intensities change rapidly near object boundaries.

In a technique called a wavelet transformation, the camera 12 may spatially filter the image in different directions to produce frequency sub-band images, and the camera 12 may then compress the data associated with the sub-band images. The transformation of the original pixel image into the frequency sub-band images typically includes spatially filtering the original pixel image (and thus, the associated data) in both vertical and horizontal directions. For example, referring to FIG. 2, a 9-7 bi-orthogonal spline filter may be used to filter an original pixel image 18 (having a resolution of 1280 columns by 960 rows, for example) to produce four frequency sub-band images 19 (each having a resolution of 640 columns by 480 rows, for example). Thus, the sub-band images 19 represent the image 18 after being spatially filtered along the vertical and horizontal directions.

Referring to FIG. 3, to compress the data associated with the original frame, the camera 12 may first transform (block 2) the corresponding pixel image into frequency sub-band images. After the transformation, the camera 12 may quantize (block 3) the data associated with the frequency sub-band images 19 to reduce the bit precision (and size) of the data and increase the number of zeros in the data. For example, the camera 12 might truncate the four least significant bits of each byte of the data. Therefore, for example, instead of each intensity value being represented by eight bits, each intensity value may instead be represented by four bits.

To complete the compression, the camera 12 may entropy encode (block 4) the quantized data. In entropy encoding, redundant data patterns are consolidated. Therefore, because the quantization increases the number of zeros in the data, the quantization typically enhances the effectiveness of the entropy encoding. As an example, one type of entropy encoding, called Huffman encoding, uses variable length codes to represent the data. The shorter codes are used to represent patterns of the data that occur more frequently, and the longer codes are used to represent patterns of the data that occur less frequently. By using this scheme, the total size of the data is reduced.

Once the computer 14 receives the compressed frame, the computer 14 may then follow the decompression steps described above in a reverse order in an attempt to reconstruct the original pixel image. Referring to FIG. 4, the computer 14 may perform (block 20) an inverse entropy function to reconstruct the quantized data for the sub-band images. The computer 14 may then perform (block 22) an inverse quantization function to reconstruct the data for the original sub-band images 19 and then perform (block 24) an inverse transform function on this data to reconstruct the original pixel image. Unfortunately, the precision lost by the quantization is not recoverable. For example, if in the quantization eight bits of data are quantized to produce four bits of data, the lost four bits are not recoverable when inverse quantization is performed. As a result, one problem with the above-described compression technique is that the quantization may introduce a large change in the intensity of a pixel after compression for a relatively small change in intensity of the pixel before compression.

For example, before quantization, a spatial intensity 6 (see FIG. 5) of pixels of a particular row of a frequency sub-band image may be close to a quantization threshold level (called $I_1$). For video, the intensity 6 may vary slightly from frame to frame due to artifacts, or noise, present in the system, and these changes may be amplified by the quantization. The amplified artifacts (an effect called scintillation) may cause otherwise stationary objects to appear to move in the reconstructed video. The human eye may be quite sensitive to this motion, and thus, the perceived quality of the video may be degraded.

Thus, there is a continuing need for a digital imaging system that reduces the amplification of artifacts in the compression/decompression process.

BRIEF DESCRIPTION OF THE DRAWING

FIG. 3 is a flow diagram illustrating a process to compress a frame.

FIG. 4 is a flow diagram illustrating a process to decompress a frame.

FIGS. 23, 24, 25, 26, 27 and 28 illustrate waveforms of signals of the unit of FIG. 16 when the unit operates in the inverse transformation mode.

SUMMARY

In one embodiment, a method includes generating first difference frames and compressing the first difference frames to form compressed difference frames. The compressed difference frames are decompressed to form decompressed difference frames, and the decompressed difference frames are used in the generation of the first difference frames.

DETAILED DESCRIPTION

Figure 1:
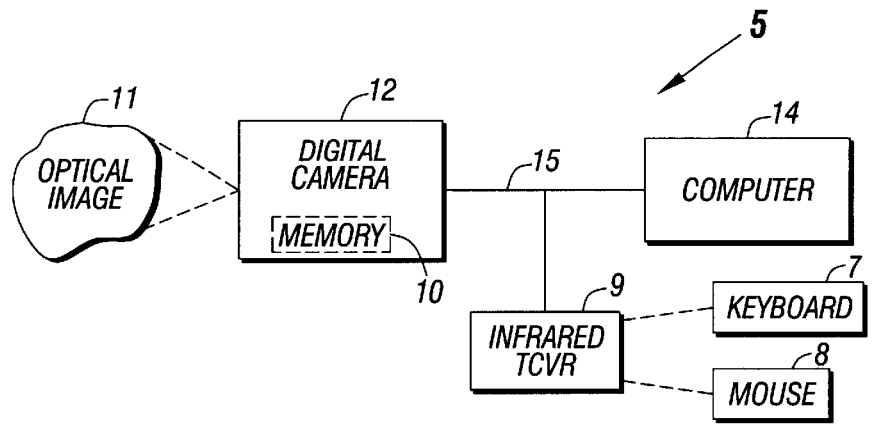
FIG. 1 is a schematic diagram of a digital imaging system of the prior art.
Figure 2:
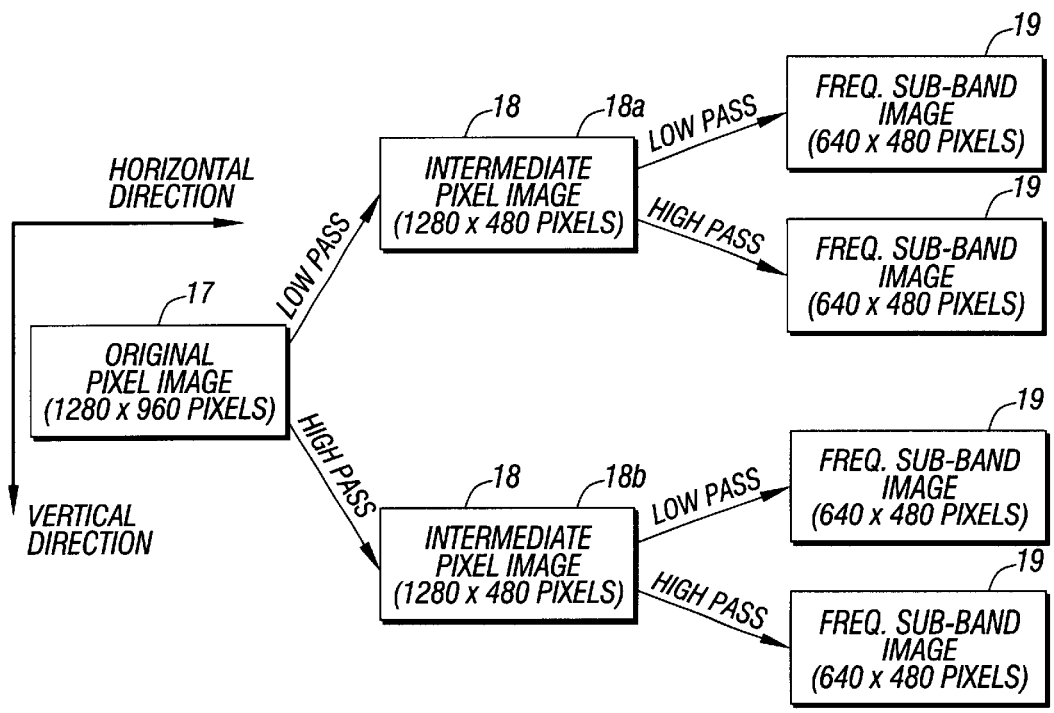
FIG. 2 is an illustration of a process to generate frequency sub-band images.
Figure 5:
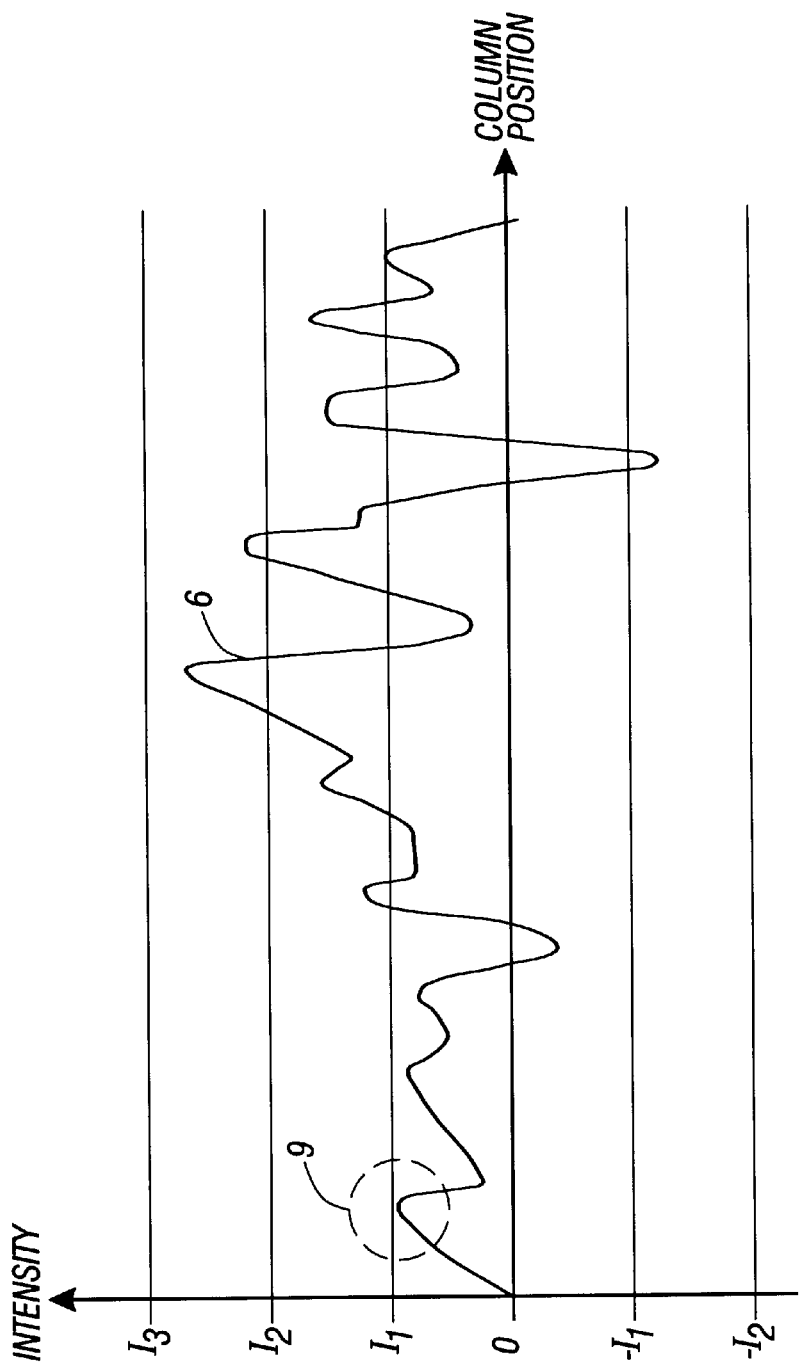
FIG. 5 is a graph illustrating intensity values for pixels of a row.
Figure 6:
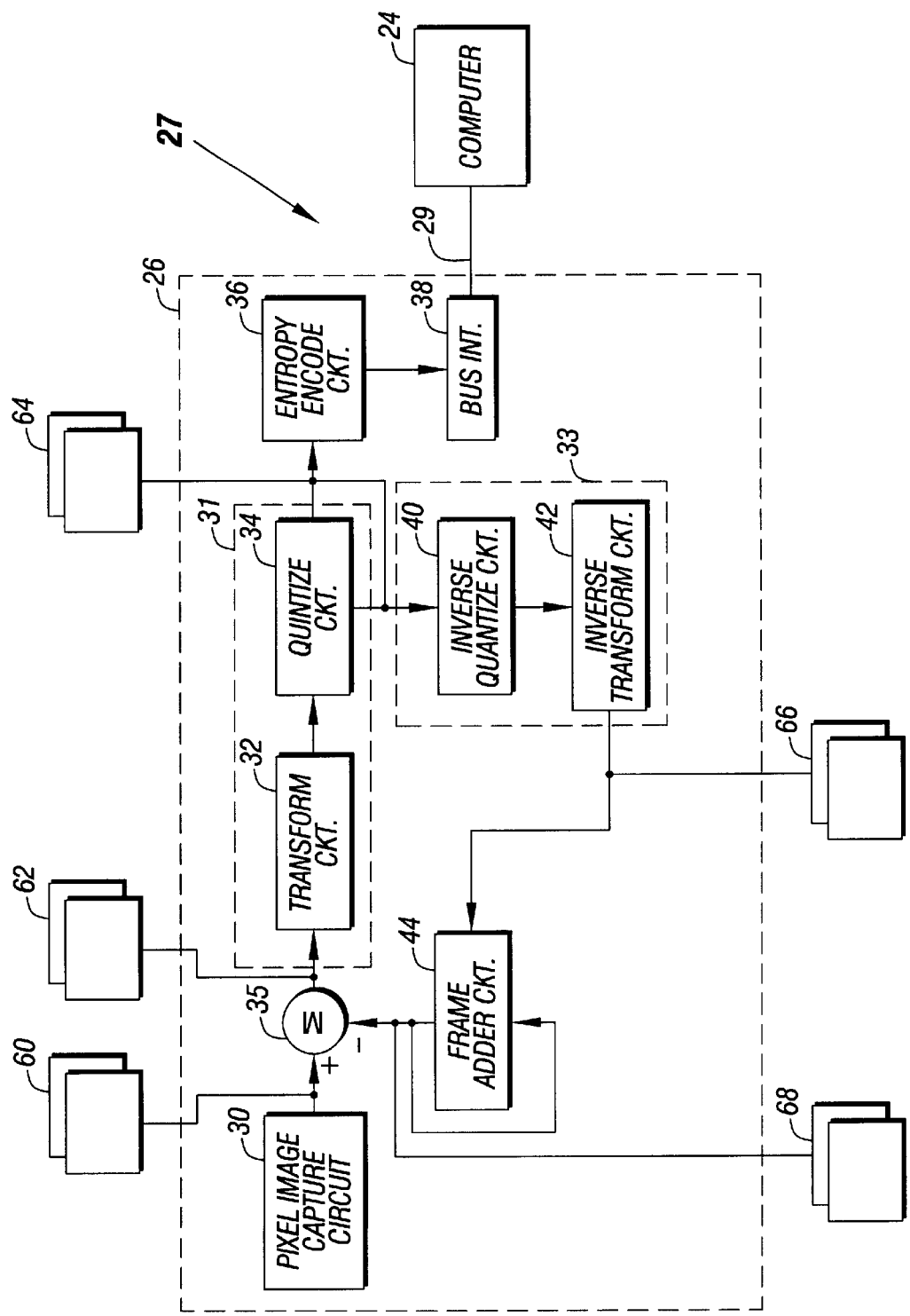
FIG. 6 is a schematic diagram of a digital imaging system according to an embodiment of the invention.
Figure 7:
FIGS. 7, 8, 9, 10 and 11 are timing diagrams illustrating the generation of the difference frames.
Figure 8:
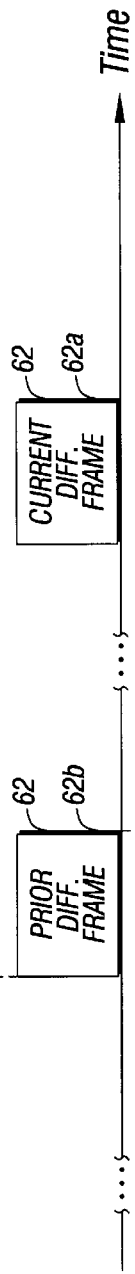
Figure 9:
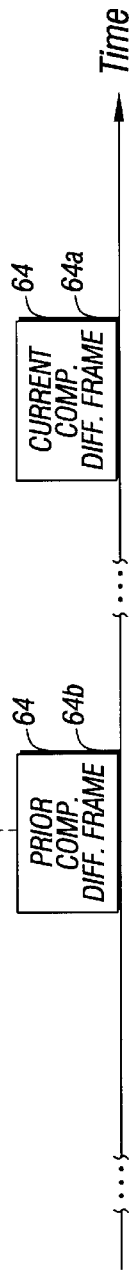
Figure 10:
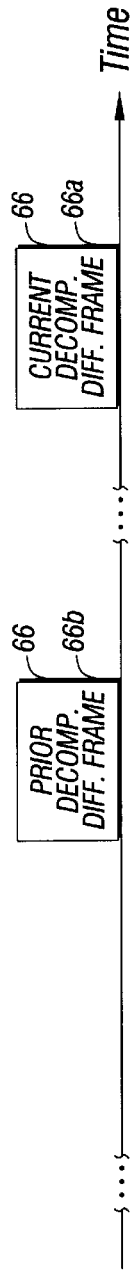
Figure 11:
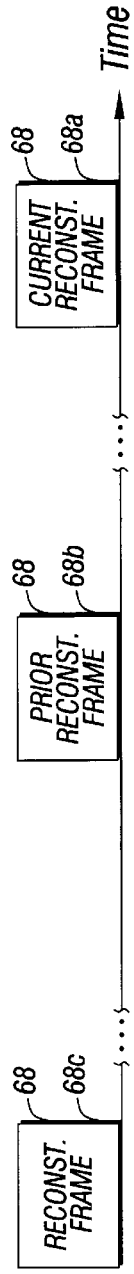

Referring to FIG. 6, an embodiment 27 of a digital imaging system in accordance with the invention includes a digital camera 26 which may capture video that is displayed by a computer 24. In this manner, the camera 26 may electrically capture successive pixel images to form captured frames of image data which indicate the pixel images. To reduce the bandwidth otherwise required to transmit the image data to the computer 24 (via a serial bus 29), the camera 26 uses techniques to compress the size of the transmitted frames.

In particular, instead of transmitting the frames, as captured, to the computer 24, the camera 26 may generate difference frames, compress the difference frames and then transmit the compressed difference frames to the computer 24. Each difference frame indicates the differences in pixel intensities (on a pixel-by-pixel basis) between two successive images that are captured by the camera 26. Because typically little motion occurs between two successively captured pixel images, the resultant difference frame may include a substantial amount of nonessential and redundant information that may be removed by compression. Thus, in general, the compressed difference frame is much smaller than any of the frames that are captured by the camera 26.

For purposes of reducing the potential amplification of artifacts by the compression/decompression process, the camera 26 decompresses a copy of each compressed difference frame (that is transmitted to the computer 24) in an attempt to reconstruct a frame as originally captured by the camera 26. However, instead of being an exact duplicate of the corresponding captured frame, the reconstructed frame indicates errors that are introduced by the compression/decompression process. As described below, the camera 26 uses the reconstructed frame in a feedback loop to minimize the artifacts introduced by the compression/decompression process.

The computer 24, as typical, already performs the function of reconstructing the captured frames from difference frames for purposes of displaying images on a monitor. In this manner, to reconstruct the next frame, the computer 24 decompresses a newly received difference frame and adds this difference frame to a previously reconstructed frame (the frame that indicates the image currently being displayed by the computer 24, for example). However, it has been discovered that without error compensation by the camera, errors (quantization errors, for example) may be amplified by the compression/decompression process. These amplified errors appear in the corresponding image that is displayed by the computer 24.

Referring also to FIGS. 7, 8, 9, 10 and 11, like the computer 24, the camera 26 reconstructs frames (called reconstructed frames 68) from compressed difference frames 64 (frames 64a and 64b, as examples). However, the camera 26 uses the reconstructed frames 68 in a feedback loop to minimize the amplification of errors in the compression/decompression process. The feedback loop is also used to form the difference frames.

As an example, the circuitry of the camera 26 may include a pixel image capture circuit 30 that captures pixel images to generate captured frames 60 (frames 60a and 60b, as examples) that indicate the corresponding captured pixel images. A frame adder circuit 35 (of the camera 26) forms the current difference frame 62a by subtracting intensity values indicated by a prior reconstructed frame 68b from the corresponding intensity values indicated by the current captured frame 60a.

A decompression circuit 33 processes copies of compressed difference frames 64 which are generated by a compression circuit 31. The compression circuit 31 receives the difference frames 62 from the frame adder circuit 35. The decompression circuit 33 decompresses the copies of the compressed difference frames 64 to generate decompressed difference frames 66 (frames 66a and 66b, as examples).

A frame adder circuit 44 (of the camera 26) receives the decompressed difference frames 66 and generates the reconstructed frames 68. To accomplish this, the frame adder circuit 44 generates each new reconstructed frame 68 by combining the most recently decompressed difference frame 66 with the prior reconstructed frame 68 that was generated by the frame adder circuit 44. Thus, for example, the frame adder 44 generates the prior reconstructed frame 68b (used to generate the current difference frame 62b) by combining the reconstructed frame 68c with the prior difference frame 66b.

Figure 12:
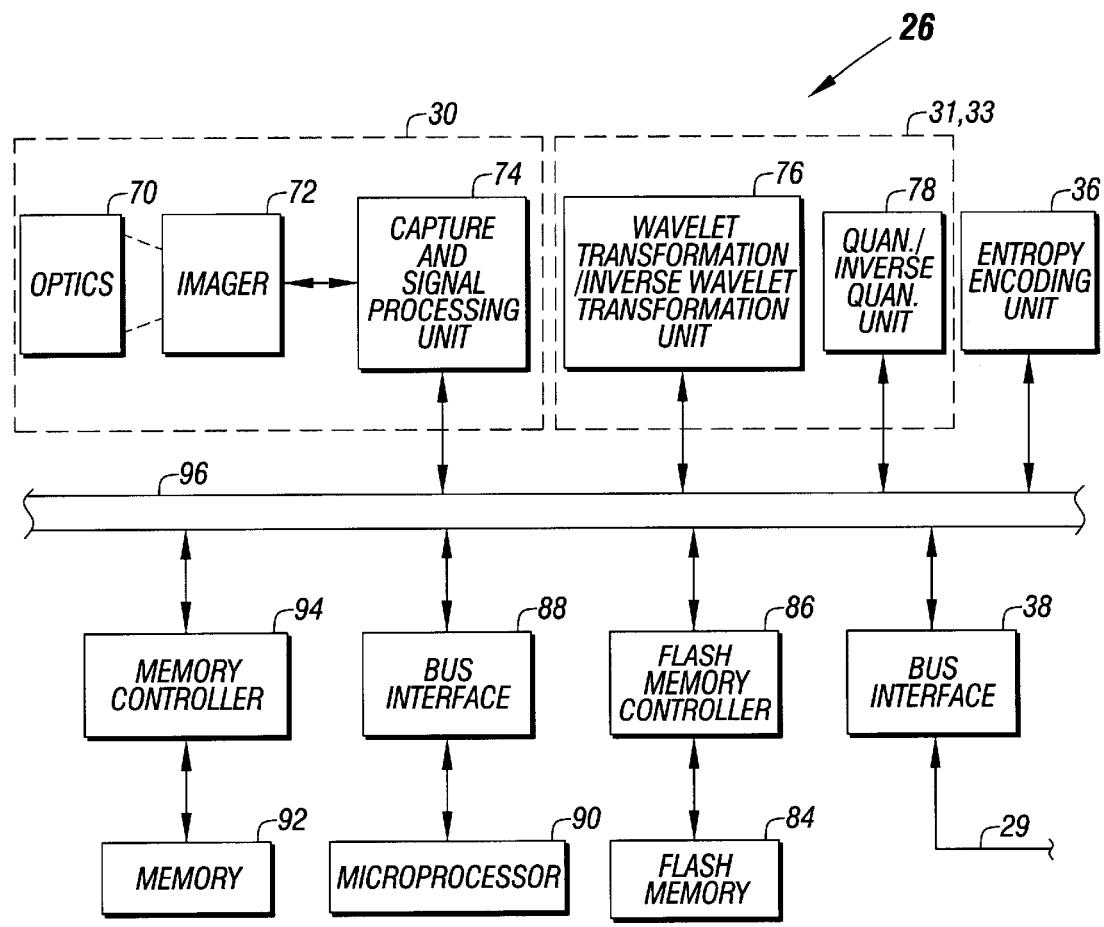
FIG. 12 is a schematic diagram of the camera of FIG. 6.

Referring to FIG. 12, in some embodiments, the pixel image capture circuit 30 includes optics 70 to focus an optical image onto a focal plane of an imager 72. The pixel image capture circuit 30 may also include a capture and signal processing unit 74. The capture and signal processing unit 74 interacts with the imager 72 to capture representations (i.e., pixel images) of optical images and transfers the resultant captured frames 60 (see FIG. 7) to a random access memory (RAM) 92. To accomplish this, the capture and signal processing unit 74 is coupled to a bus 96, along with a memory controller 94 which receives the frame from the bus 96 and generates signals to store the data in the memory 92.

In some embodiments, the compression 31 and decompression 33 circuits may be formed from a transformation/ inverse transformation unit 76 and a quantization/inverse quantization unit 78. However, in other embodiments, the transformation, inverse transformation, quantization and inverse quantization functions may be performed by separate units. Other arrangements are also possible.

Besides performing the transformation functions for both compression and decompression, the unit 76 may retrieve and combine the captured 60 and reconstructed 68 frames to form the difference frames 64 and thus, perform the functions of the adder circuit 35. In performing the transformation (for the compression circuit 31) and inverse transformation (for the decompression circuit 33) functions, the unit 76 is coupled to the bus 96 to interact with the memory 92 to retrieve and store the appropriate frames. Similarly, in performing the quantization (for the quantization for the compression circuit 31) and inverse quantization (for the decompression circuit 33) functions, the unit 78 is coupled to the bus 96 to interact with the memory 92 to retrieve and store the appropriate frames.

An entropy encoding circuit 36 is coupled to the bus 96 to retrieve the compressed difference frames 64 from the memory 92 and entropy encode these frames before returning the entropy encoded difference frames to the memory 92. A serial bus interface 38 is coupled to the bus 96 to retrieve the entropy encoded difference frames and generate signals on the bus 96 to transmit the frames to the computer 24 via the bus 29.

In some embodiments, the camera 26 may also include a flash memory 84 to store frames for still pixel images that are captured by the camera 26. The flash memory 84 is accessed via a flash memory controller 86 which coupled between the flash memory 84 and the bus 96. The camera 26 may also include a microprocessor 90 to coordinate the activities of the camera 26. The microprocessor 90 may be coupled to the bus 96 via a bus interface 88.

Figure 13:
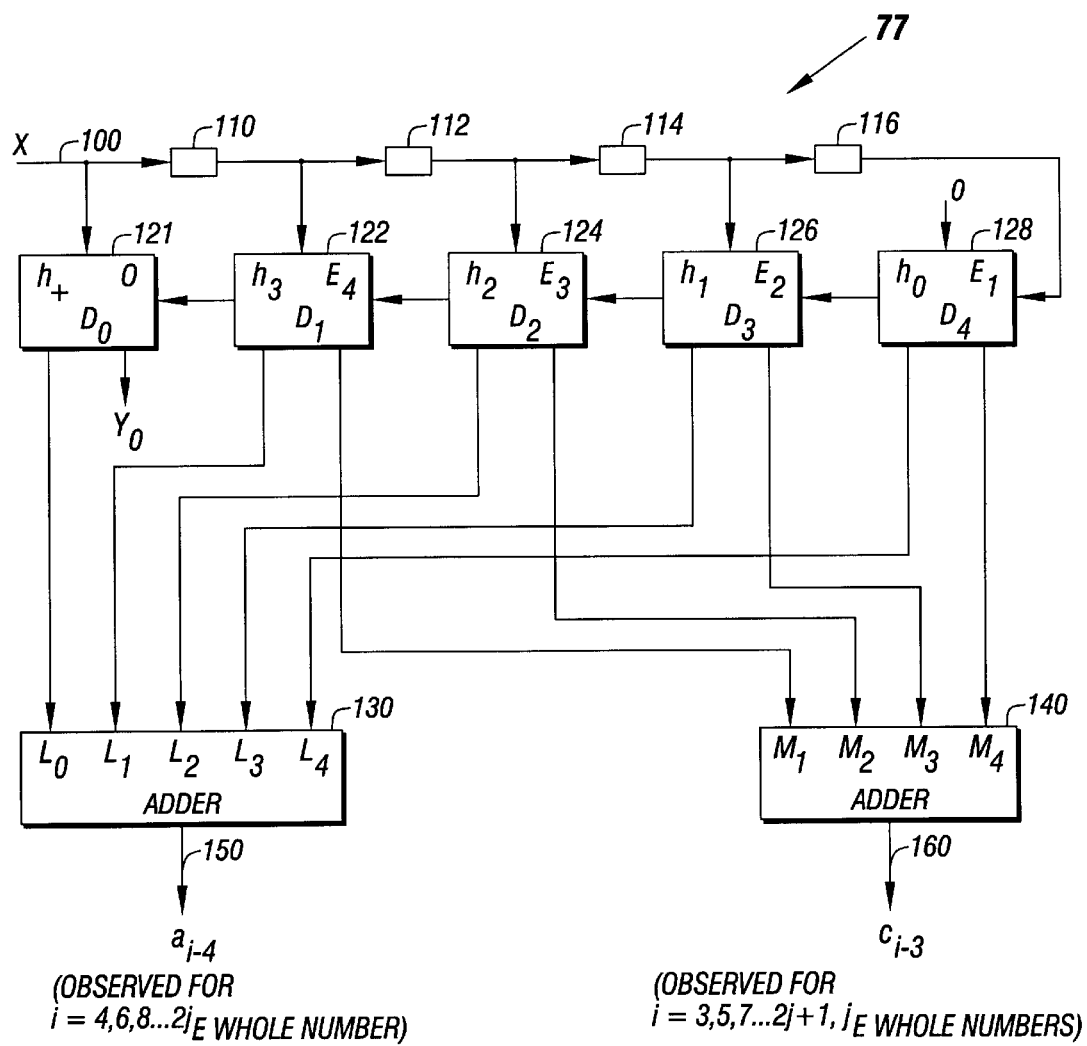
FIG. 13 is a block diagram of a forward wavelet transformation unit.
Figure 15:
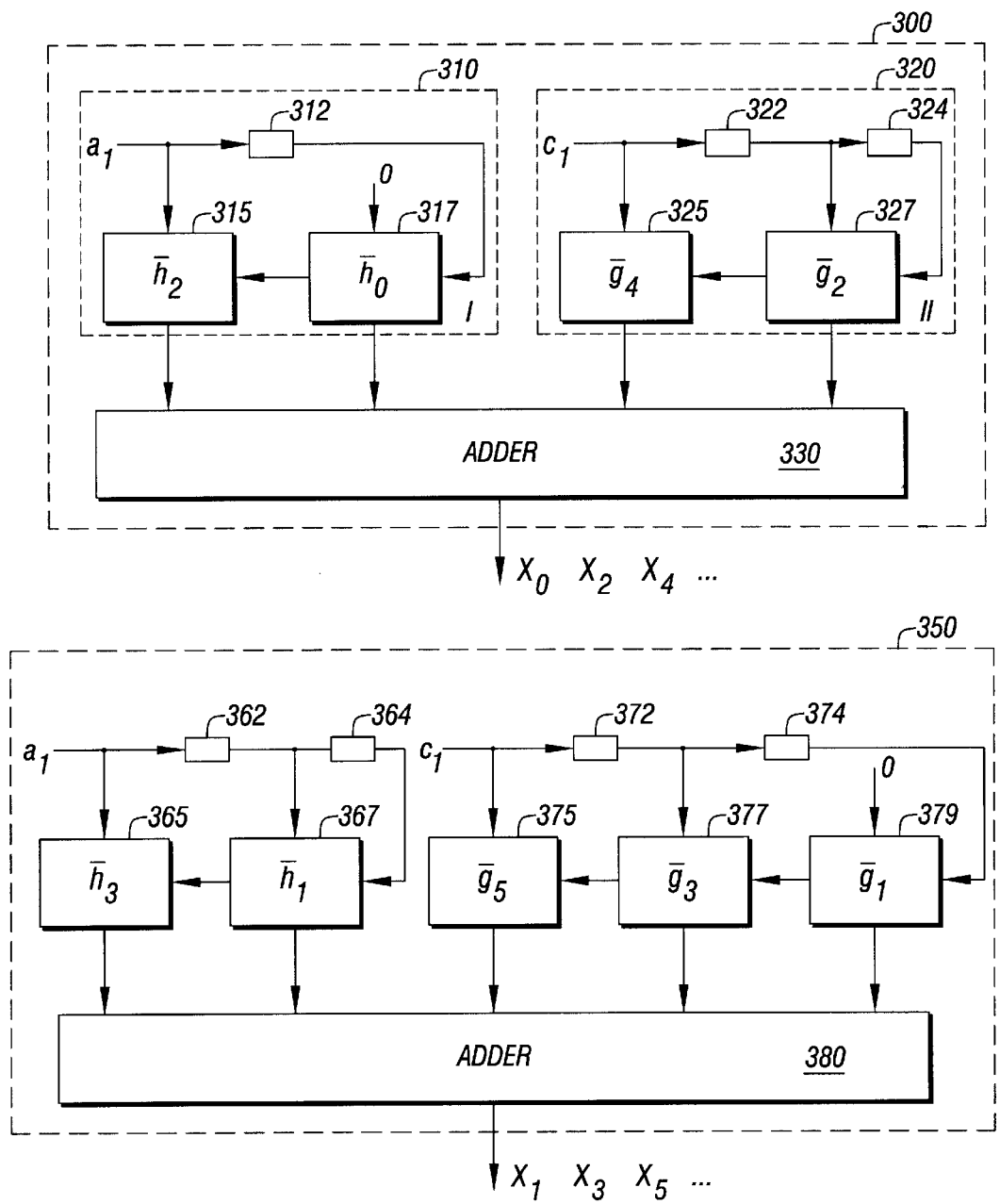
FIG. 15 is a schematic diagram of inverse wavelet transformation units.

In some embodiments, the unit 76 may include a forward wavelet transformation unit 77 (see FIG. 13) and reverse wavelet transformation units 300 and 350 (see FIG. 15). Referring to FIG. 13, the forward wavelet transformation unit 77 receives an input $x_i$ 100 which is a single N-bit integer or floating point value from an input sequence representing discrete samples of an input signal that is to be encoded. In order for the forward wavelet transformation unit 77 to be initialized, inputs $x_1$, $x_2$, $x_3$, and $x_4$ propagate through delay elements 110, 112, 114, and 116. Thereafter, for every $x_i$ 100 that is received by the unit 77, two outputs are generated by unit 77. These two outputs are shown in FIG. 13 as $a_{i-4}$ 150, which is a low frequency sub-band (LFS) output and, $c_{i-3}$ 160, which is a high frequency sub-band (HFS) output.

Each of the basic processing cells 121, 122, 124, 126 and 128 of the unit 77 include an adder and a multiplier and produce two sets of intermediate outputs. The first set of intermediate outputs, $L_0$ from cell $D_0$ 121, $L_1$ from cell $D_1$ 122, $L_2$ from cell $D_2$ 124, $L_3$ from cell $D_3$ 126, and $L_4$ from cell $D_4$ 128, are added by an adder 130 to generate the LFS values $a_{i-4}$ 150. Likewise, the second set of intermediate outputs, $M_1$ from cell $D_1$ 122, $M_2$ from cell $D_2$ 124, $M_3$ from cell $D_3$ 126, and $M_4$ from cell $D_4$ 128, are added together by an adder 140 to generate the HFS values $c_{i-3}$ 160. To generate the first HFS output $c_0$, which occurs at i=3 (i=0, 1, 2 . . . ), the first four cycles and, consequently, the first three intermediate outputs, $L_1$, $L_2$, and $L_3$ are required. On the next clock cycle, at i=4, the LFS output $a_0$ is generated and observed. Thus, the outputs $a_{i-4}$ 150 and $c_{i-3}$ 160 are observed alternatively at the trailing edges of even and odd clock cycles. The architecture is therefore 100% utilized since, at every clock cycle, one output, (either $a_{i-4}$ or $c_{i-3}$) is being generated. Though not shown in FIG. 13, a multiplexer with a clock (alternating sequence) as a control signal may be used in other embodiments to observe the alternating outputs in the proper sequence.

The architecture of the unit 77 is "systolic", i.e., repeated, in that each of the processing cells 121, 122, 124, 126 and 128 include one adder and one multiplier and may vary only in the value of the filter coefficients which may be stored in a programmable register or other memory.

Figure 14:
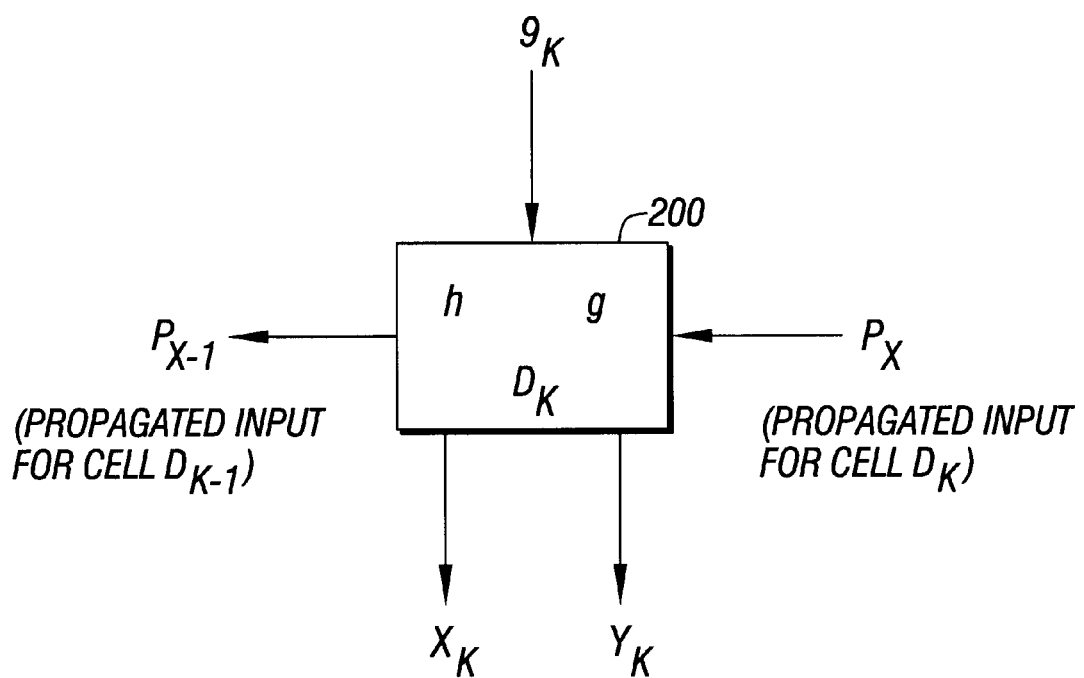
FIG. 14 is a schematic diagram of a cell of the unit of FIG. 13.

Referring also to FIG. 14, given two filter coefficients, h and g, with h representing the high-pass coefficients and g representing the low pass coefficients, the intermediate output $L_k$ is computed by the following expression: $L_k = (p_k + q_k)*h$. Likewise, the intermediate output $M_k$ is computed by cell 200 according to the following expression: $M_k = (p_k + q_k)*g$. In the expressions for $L_k$ and $M_k$, the term $q_k$ represents the input data $x_i$ 100 which is the subject of the discrete wavelet transform (DWT), and the term $p_{k-1}$ refers to the input data $x_i$ 100 from the coupled processing cell from: the previous clock cycle. The term $p_k$ represents the input data the current clock cycle. The input $p_k$ is passed through to output $p_{k-1}$ from a cell $D_k$ to the previous cell $D_{k-1}$ in the array. Thus, the terms $p_k$ and $p_{k-1}$ may be referred to as "propagated inputs."

The basic processing cell 200, shown in FIG. 14 may be repeatedly built and coupled to perform the forward DWT computation. The DWT may be advantageous for compression since it is a "pyramid" algorithm. In a pyramid algorithm, for a one-dimensional DWT, every other sample is thrown away or downsampled, and thus the data set is halved at each iteration. Thus, after J iterations of the FIG. 13 computation, the number of samples being manipulated shrinks by $2^J$. To compute a DWT of a signal of N samples, the CPU cycle time required would amount to only K*N, where K is a constant determined by the Wavelet chosen (i.e., chosen by the coefficients used).

The forward DWT computation may be represented by $a_n = \Sigma_K h_{2n-K-K} x_K$ (LFS outputs) and $c_n = \Sigma_K g_{2n-K} x_K$ (HFS outputs). The low-pass filter coefficients $h_i$ and the high-pass filter coefficients $g_i$ have certain symmetric properties which can be manipulated to implement the unit 77. The filters used for the DWT may be IIR (Infinite Impulse Response) or FIR (Finite Impulse Response) digital filters. For example, one type of filter may be a biorthogonal spline filter that has nine low-pass filter coefficients $h_{-4}$, $h_{-3}$, $h_{-2}$, $h_{-1}$, $h_0$, $h_1$, $h_2$, $h_3$, and $h_4$. The biorthogonal spline filter also has seven high-pass filter coefficients $g_{-2}$, $g_{-1}$, $g_0$, $g_{-1}$, $g_{-2}$, $g_3$, and $g_4$.

The LFS outputs are as follows:

$$a_0 = h_0 x_0 + h_{-1} x_1 + h_{-2} x_2 + h_{-3} x_3 + h_{-4} x_4,$$

$$a_1 = h_2 x_0 + h_1 x_1 + h_0 x_2 + h_{-1} x_3 + h_{-2} x_4 + h_{-3} x_5 + h_{-4} x_6,$$

$$a_2 = h_4 x_0 + h_3 x_1 + h_2 x_2 + h_1 x_3 + h_0 x_4 + h_{-1} x_5 + h_{-2} x_6 + h_{-3} x_7 + h_{-4} x_8,$$

and continue to follow the below sequence:

$$a_{n/2-2} = h_4 x_{N-8} + h_3 x_{N-7} + h_2 x_{N-6} + h_1 x_{N-5} + h_0 x_{N-4} + h_{-1} x_{N-3} + h_{-2} x_{N-2} + h_{-3} x_{N-1},$$

$$a_{n/2-1} = h_4 x_{N-6} + h_3 x_{N-5} + h_2 x_{N-4} + h_1 x_{N-3} + h_0 x_{N-2} + h_{-1} x_{N-1},$$

One property of the low-pass filter coefficients is that of symmetry such that $h_{-i} = h_i$. Thus, $h_{-1} = h_1$, $h_{-2} = h_2$, $h_{-3} = h_3$, and $h_{-4} = h_4$ Thus, for example, $a_1$ may be rewritten as:

$$a_1 = h_0 x_2 + h_1(x_1 + x_3) + h_2(x_0 + x_4) + h_3 x_5 + h_4 x_6.$$

Likewise, other LFS outputs may be conveniently re-arranged such that only one add and one multiply operation is required in each processing cell. The simplified LFS outputs after applying the symmetric filter properties for low-pass coefficients are as follows:

$$a_0 = h_0 x_0 + h_1 x_1 + h_2 x_2 + h_3 x_3 + h_4 x_4 = h_0(x_0 + 0) + h_1(x_1 + 0) + h_2(x_2 + 0) + h_3(x_3 + 0) + h_4(x_4 + 0)$$

$$a_1 = h_2 x_0 + h_1 x_1 + h_0 x_2 + h_1 x_3 + h_2 x_4 + h_3 x_5 + h_4 x_6 = h_0(x_2 + 0) + h_1(x_1 + x_3) + h_2(x_0 + x_4) + h_3(x_5 + 0) + h_4(x_6 + 0)$$

$$a_2 = h_0(x_4 + 0) + h_1(x_3 + x_5) + h_2(x_2 + x_6) + h_3(x_1 + x_7) + h_4(x_0 + x_8)$$

$$a_3 = h_0(x_6 + 0) + h_1(x_5 + x_7) + h_2(x_4 + x_8) + h_3(x_3 + x_9) + h_4(x_2 + x_{10})$$

$$a_4 = h_0(x_8 + 0) + h_1(x_7 + x_9) + h_2(x_6 + x_{10}) + h_3(x_5 + x_{11}) + h_4(x_4 + x_{12})$$

The symmetry of the coefficients also reduces the total number of processing cells required so that an architecture like that if the unit 77 may be used to compute the forward DWT. At the fourth clock cycle, where i=3, $a_{i-4}$ is ignored (skipped), and $c_0$ is instead observed after being computed, which is the first HFS output is described below.

At the fifth clock cycle, i=4, the $c_{i-3}$ 160 output is skipped, and instead, the LFS output $a_{i-4}$ 150 is instead observed. The term $a_0$ is computed as follows. At i=4, the fifth clock cycle, cell $D_0$ 121 receives $X_4$, $D_1$ 122 receives $X_3$ (from previous cycle), $D_2$ 124 receives $X_2$, $D_3$ 126 receives $x_1$ and $D_4$ 128 receives 0 as their respective $q_i$ values. Also, at i=4, the propagated input $p_i$ for cell $D_4$ 128 is $x_0$. Since there is, by definition, no $x_{-1}$, $x_{-2}$, etc., cells $D_1$ 122 and $D_0$ 121 receive nulls, or 0, values at i=4. Using the basic formula $L_i = (p_i + q_i)^* h$ for each processing cell, $D_0$ 121 provides the intermediate output $L_0 = (0 + x_4)^* h_4$. Likewise, $D_1$ 122 generates $L_1 = (0 + x_3)^* h_3$, $D_2$ 124 generates $L_2 = (0 + x_2)^* h_2$, $D_3$ 126 generates $L_3 = (0 + x_1)^* h_1$ and $D_4$ 128 generates $L_4 = (x_0 + 0)^* h_0$. Adder 130 computes the sum of $L_0$, $L_1$, $L_2$, $L_3$ and $L_4$ which yields the first output $a_0 = x_0 h_0 + x_1 h_1 + x_2 h_2 + x_3 h_3 + x_4 h_4$.

In the case for i=4, $D_3$ 126 receives no propagated input from $D_4$ 128 since $D_4$ 128 received no propagated input $q_i$ until i=4. Similarly, all the LFS outputs $a_{i-4}$ 150 and $c_{i-3}$ 160 may be computed. The processing cell 200 may also contain a latch register or other mechanism to hold propagated inputs before passing them to the next cell. One reasonably skilled in the art of digital design will readily be able to design/implement the add, multiply and delay elements required by the precision/value of the DWT inputs and outputs.

The HFS outputs are as follows:

$$c_0 = g_0 x_0 + g_{-1} x_1 + g_{-2} x_2,$$

$$c_1 = g_2 x_0 + g_1 x_1 + g_0 x_2 + g_{-1} x_3 + g_{-2} x_4,$$

$$c_2 = g_4 x_0 + g_3 x_1 + g_2 x_2 + g_1 x_3 + g_0 x_4 + g_{-1} x_5 + g_{-2} x_6,$$

and continue to follow the below sequence:

$$c_{n/2-2} = g_4 x_{N-8} + g_3 x_{N-7} + g_2 x_{N-6} + g_1 x_{N-5} + g_0 x_{N-4} + g_{-1} x_{N-3} + g_{-2} x_{N-2},$$

$$c_{N/2-1} = g_4 x_{N-6} + g_3 x_{N-5} + g_2 x_{N-4} + g_1 x_{N-3} + g_0 x_{N-2} + h_{-1} x_{N-1},$$

The high-pass coefficients are also symmetric, but in a different sense. The inverse DWT low-pass filter coefficients are represented by $\bar{h}$. These inverse coefficients are symmetric such that $\bar{h}_n = \bar{h}_{-n}$. The high-pass forward DWT filter coefficients have the property $g_n = (-1)\bar{h}_{1-n}$. Since $\bar{h}_n = \bar{h}_{-n}$, also $g_n = (-1)^n \bar{h}_{n-1}$. Thus, for n=2, $g_2 = h_1$, but also for n=0, $g_0 = h_1$. Therefore, $g_2 = g_0 = \bar{h}_1$. Likewise, it can be shown that $g_{-2} = g_4 = \bar{h}_3$ and $g_{-1} = g_3 = \bar{h}_2$. Substituting these equations for the expanded $c_n$ yields, for instance, $c_2 = g_1 x_3 + g_2(X_2 + X_4) + g_3(x_1 + X_5) + g_4(X_0 + X_6)$. Thus, only the coefficients $g_1$, $g_2$, $g_3$ and $g_4$ are required to computer the HFS outputs $c_{i-3}$ 160. The symmetric property of biorthogonal spline filter coefficients allows a great reduction in computation and consequently in the architecture required.

The simplified HFS outputs after the symmetric filter properties for high-pass coefficients are as follows:

$$c_0 = g_2 x_0 + g_3 x_1 + g_4 x_2 = g_2(x_0 + 0) + g_3(x_1 + 0) + g_4(x_2 + 0)$$

$$c_1 = g_2 x_0 + g_1 x_1 + g_0 x_2 + g_{-1} x_3 + g_{-2} x_4 = g_1(x_1 + 0) + g_2(x_2 + x_0) + g_3(x_3 + 0) + g_4(x_4 + 0)$$

$$c_2 = g_4 x_0 + g_3 X_1 + g_2 x_2 + g_1 x_3 + g_0 x_4 + g_{-1} x_5 + g_{-2} x_6 = g_1(x_3 + 0) + g_2(x_4 + x_2) + g_3(x_5 + x_1) + g_4(x_6 + X_0)$$

$$c_3 = g_4 x_2 + g_3 x_3 + g_2 x_4 + g_1 x_5 + g_0 x_6 + g_1 x_7 + g_{-2} x_8 = g_1(x_5 + 0) + g_2(x_6 + x_4) + g_3(x_7 + x_3) + g_4(x_8 + X_2)$$

$$c_5 = g_4 x_4 + g_3 x_5 + g_2 x_6 + g_1 x_7 + g_0 x_8 + g_{-1} x_9 + g_{-2} x_{10} = g_1(x_7 + 0) + g_2(x_8 + x_6) + g_3(x_9 + x_5) + g_4(x_{10} + x_4)$$

The first clock cycle producing a valid HFS output is at i=3. At i=3, cell $D_1$ 122 receives as its $q_i$ the input value $x_2$ (delayed at i=2 or delay element 110), $D_2$ 124 receives $x_1$ and $D_3$ 126 receives $x_0$. $D_4$ 128 always receives a $q_i$ of 0. The propagated inputs $p_i$ at i=3 are all 0. Therefore, according to the basic formula $M_i = (p_i + q_i)^* g$, the intermediate outputs at i=3 are: $M = x_2 g_4$, $M_2 = x_1 g_3$ and $M_3 = x_0 g_2$. The intermediate output $M_4$ is zero because both $q_i$ and $p_i$ inputs are 0 for cell $C_4$ 128. Adder 140 adds the intermediate outputs $M_1$, $M_2$, $M_3$ and $M_4$ to obtain a $c_0 = x_0 g_2 + x_1 g_3 + x_2 g_4$, which matches the first term for the simplified HFS output. At i=4, as mentioned when discussing the LFS output, the HFS output is ignored, not observed and instead, at i=5, the next HFS output $c_1$ is observed.

Table 1 below summarizes the intermediate outputs L and M, and final outputs $c_{i-4}$ and $a_{i-3}$ at each clock cycle for the forward DWT in the first eight clock cycles (i=0 to 7) and matches the above equations for the simplified outputs.

| i | ($L_0M_0$) | ($L_1M_1$) | ($L_2M_2$) | ($L_3M_3$) | ($L_4M_4$) | $a_{i-4}$ 150 | $c_{i-3}$ 160 |
|---|---|---|---|---|---|---|---|
| 0 | ($h_4x_0$, 0) | (0, 0) | (0, 0) | (0, 0) | (0, 0) | Not valid | Not valid |
| 1 | ($h_4x_1$, 0) | ($h_3x_0$, $g_4x_0$) | (0, 0) | (0, 0) | (0, 0) | Not valid | Not valid |
| 2 | ($h_4x_2$, 0) | ($h_3x_1$, $g_4x_1$) | ($h_2x_0$, $g_3x_0$) | (0, 0) | (0, 0) | Not valid | Not valid |
| 3 | ($h_4x_3$, 0) | ($h_3x_2$, $g_4x_2$) | ($h_2x_1$, $g_3x_1$) | ($h_1x_0$, $g_2x_0$) | (0, 0) | Not valid | $c_0$ |
| 4 | ($h_4x_4$, 0) | ($h_3x_3$, $g_4x_3$) | ($h_2x_2$, $g_3x_2$) | ($h_1x_1$, $g_2x_1$) | ($h_0x_0$, $g_1x_0$) | $a_0$ | Not observed |
| 5 | ($h_4x_5$, 0) | ($h_3x_4$, $g_4x_4$) | ($h_2x_3$, $g_3x_3$) | ($h_1x_2x_0$, $g_2x_2x_0$) | ($h_0x_1$, $g_1x_1$) | Not observed | $c_1$ |
| 6 | ($h_4x_6$, 0) | ($h_3x_5$, $g_4x_5$) | ($h_2x_4x_0$, $g_3x_4x_0$) | ($h_1x_3x_1$, $g_2x_3x_1$) | ($h_0x_2$, $g_1x_2$) | $a_1$ | Not observed |
| 7 | ($h_4x_7$, 0) | ($h_3x_6x_0$, $g_4x_6x_0$) | ($h_2x_5x_1$, $g_3x_5x_1$) | ($h_1x_4x_2$, $g_2x_4x_2$) | ($h_0x_3$, $g_1x_3$) | Not observed | $c_2$ |

Referring to FIG. 15, for the inverse transform, the reconstruction of the sequence $x_i$ may be represented by the expression $x_i = \Sigma_n[\bar{h}_{2n-i}a_n + \bar{g}_{2n-i}c_n] = \Sigma_n\bar{h}_{2n-i}a_n + \Sigma_n\bar{g}_{2n-i}c_n$, where $a_n$ represents the LFS outputs of the forward DWT and $c_n$ represents the HFS outputs. The inverse DWT has inverse high pass filter coefficients $\bar{g}$ and inverse low pass filter coefficients $\bar{h}$.

The $x_i$ reconstruction may be split into a sum of two summations:

$$x_i^{(1)} = \Sigma_n \bar{h}_{2n-i} a_n, \quad x_i^{(2)} = \Sigma_n \bar{g}_{2n-i} c_n.$$

The even terms of $x_i^{(1)}$ and $x_i^{(2)}$, i.e. $x_{2j}^{(1)}$ and $x_{2j}^{(2)}$ for $j=0, 1, \ldots, n/2-1$ using these filter coefficients are expanded as:

$$x_0^{(1)} = \bar{h}_0 a_0 + \bar{h}_2 a_1, \quad x_0^{(2)} = \bar{g}_0 c_0 + \bar{g}_2 c_1 + \bar{g}_4 c_2,$$

$$x_2^{(1)} = \bar{h}_{-2} a_0 + \bar{h}_0 a_1 + \bar{h}_2 a_2, \quad x_2^{(2)} = \bar{g}_{-2} c_0 + \bar{g}_0 c_1 + \bar{g}_2 c_2 + \bar{g}_4 c_3,$$

$$x_4^{(1)} = \bar{h}_{-2} a_1 + \bar{h}_0 a_2 + \bar{h}_2 a_3, \quad x_2^{(2)} = \bar{g}_{-2} c_1 + \bar{g}_0 c_2 + \bar{g}_2 c_3 + \bar{g}_4 c_4,$$

and continue pursuant to the sequence described below:

$$x_{n-6}^{(1)} = \bar{h}_{-2} a_{n/2-4} + \bar{h}_0 a_{n/2-3} + \bar{h}_2 a_{n/2-2}, \quad x_{n-6}^{(2)} = \bar{g}_{-2} c_{n/2-4} + \bar{g}_0 c_{n/2-3} + \bar{g}_2 c_{n/2-2} + \bar{g}_4 c_{n/2-1},$$

$$x_{n-4}^{(1)} = \bar{h}_{-2} a_{n/2-3} + \bar{h}_0 a_{n/2-2} + \bar{h}_2 a_{n/2-1}, \quad x_{n-4}^{(2)} = \bar{g}_{-2} c_{n/2-3} + \bar{g}_0 c_{n/2-2} + \bar{g}_2 c_{n/2-1},$$

$$x_{n-2}^{(1)} = \bar{h}_{-2} a_{n/2-2} + \bar{h}_0 a_{n/2-1}, \quad x_{n-2}^{(2)} = \bar{g}_{-2} c_{n/2-2} + \bar{g}_0 c_{n/2-1}.$$

The inverse filter coefficients like their forward counterparts have certain symmetry properties allowing some associative grouping. One property of the inverse high-pass coefficients is $\bar{g}_n = (-1)^n \bar{h}_{1-n}$. Since $h_n = h_{-n}$, the inverse high-pass coefficients also have a property such that $\bar{g}_n = (-1)^n h_{n-1}$. Thus, for $n=0$, ($\bar{g}_0 = h_{-1}$). For $n=2$, since $\bar{g}_2 = h_1$ and $h_{-1} = \bar{g}_0$, $\bar{g}_2 = \bar{g}_0$. Likewise, for $n=4$, $\bar{g}_4 = h_3 = \bar{g}_{-2}$. As discussed above, the inverse low-pass coefficients have the property $\bar{h}_n = \bar{h}_{-n}$, such that $\bar{h}_2 = \bar{h}_{-2}$. Thus, the even-numbered outputs $x_{2j}$ require only four coefficients, $\bar{h}_0, \bar{h}_2, \bar{g}_2$ and $\bar{g}_4$ in order to be computed. Similarly, for odd-numbered outputs $x_{2j-1}$, it can be shown by the same filter properties discussed above that only five coefficients, $\bar{h}_3, \bar{h}_1, \bar{g}_5, \bar{g}_3$ and $\bar{g}_1$ are required.

The equations above show the complexity of the inverse DWT computation. The architecture for computing the inverse DWT consists of two input sequences $a_i$ and $c_i$, which represent the high-frequency sub-band and the low-frequency sub-band, respectively. Comparing FIG. 14 with FIG. 13, the DWT architecture is necessarily asymmetric since the forward architecture receives one input and produces two output sequences, whereas the inverse architecture receives two inputs and produces one output. This architecture is further complicated by the fact that odd-numbered outputs, i.e., $X_1, X_3, X_5, \ldots$, require five processing cells, one for each coefficient, whereas the even-numbered outputs, i.e., $X_0, X_2, X_4, \ldots$, require only four processing cells. Moreover, the data flow for odd and even terms are not symmetric. The odd-numbered outputs are generated only odd clock cycles while even-numbered outputs are generated only on even clock cycles.

Thus, the inverse DWT architecture typically includes two distinct blocks—an even output generating block 300 and an odd output generating block 350, as shown in FIG. 15. The even output generating block 300 further includes two subcircuits—an even high frequency sub-band subcircuit (HFS) 310 and an even low frequency sub-band subcircuit (LFS) 320. Even HFS subcircuit 310 consists of two processing cells 315 and 317 each of which are composes of a multiplier and an adder. The processing cells 315, 317, 325 and 327 operate similarly to the basic processing cell 200 shown in FIG. 14 except that each needs only one coefficient and consequently computes one intermediate rather than two. For instance, processing cell 315 outputs a term such that $a_i$ is first added to the propagated input from processing cell 317, with that sum multiplied by $\bar{h}_2$. Likewise for low frequency sub-band circuit 320, processing cell 325 outputs a term to adder/controller 330 which is the product of $\bar{g}_4$ and the sum of the input $c_i$ and the propagated input from processing cell 327. Processing cell 317 receives as one input 0 and as the other input $a_{i-1}$ since delay element 312 holds the value given it on the previous clock, transmitting it on the next clock cycle.

Even output generating block operates as follows. At $i=0$, $a_0$ is propagated to delay 312, and $c_0$ to delay 322. Though $a_0$ and $c_0$ are also input to cells 315 and 325, respectively, adder/controller 330 waits until the third clock cycle to output $x_0$ and have non-zero propagated inputs. At $i=0$, cells 317 and 327 have outputs of 0, since initial values released by delays 312, 324 and 322 are set at zero. At $i=1$, delay 312 releases $a_0$ to the $p_i$ input of cell 317 and $a_1$ is held at delay 312 and input to cell 315. As a result, cell 315 generates the term $\bar{h}_2 a_1$ and cell 317 generates $\bar{h}_0 a_0$. These outputs are sent to adder/controller 330 but are held (latched) until the next clock $i=2$. At $i=1$, though cells 325 and 327 generate the terms $c_1 \bar{g}_4$ and $c_0 \bar{g}_2$, respectively, these terms are ignored (cleared) by adder/controller 330 since according to the reconstruction formula, the first output $x_0$ requires a $c_2$ term.

At $i=2$, the third clock cycle, delay 324 releases $c_0$ to the $p_i$ (propagated) input of cell 327 and delay 322 releases $c_1$ to the $q_i$ input of cell 327. Thus, cell 327 generates the term $(c_1 + c_0)\bar{g}_2$. Cell 325 generates $c_2\bar{g}_4$. As described above, the outputs of cells 315 and 317 from the previous clock were held at adder/controller 330 and are summed, at $i=2$ with the terms generated by cells 325 and 327. Again, at $i=2$, even though cells 315 and 317 generate $(a_0+a_2)\bar{h}_2$ and $a_1 h_0$, respectively, these terms are held one clock cycle. Instead, the $i-2$ outputs of cells 325 and 327 which are $c_2 \bar{g}_4$ and $(c_0+c_1)*\bar{g}_2$, respectively, are summed with the $i=1$ outputs of cells 315 and 317 which are $\bar{h}_0 a_0$ and $\bar{h}_0 a_0$ and $\bar{h}_2 a_1$. Hence, adder/controller 330 generates the first output $x_0 = \bar{h}_0 a_0 + \bar{h}_2 a_1 + c_0 \bar{g}_2 + c_1 \bar{g}_2 c_2 \bar{g}_4$.

Thus, for each clock cycle i, after i=2 (the third clock cycle), adder/controller 330 receives current outputs of subcircuit 320 and adds them to the previous clock's outputs from subcircuit 310. Additionally, adder/controller 330 receives the current output of subcircuit 310, holding them until the next clock cycle.

FIG. 15 also shows an odd output generating block 350 which requires five processing cells—365, 367, 375, 377 and 379. The processing cells 365, 367, 375, 377 and 379 operate similarly to the processing cell 200 shown in FIG. 14. The delay elements 362, 364, 372 and 374 hold their inputs for one clock cycle and release them on the next clock cycle. Each cell has an adder and multiplier and receives a propagated input from the cell to which it is connected.

Odd output generating block 350 operates as follows. At i=0, $a_0$ is propagated to cell 365 and is held one clock cycle at delay 362, while cell 375 receives $c_0$. At i=1, delay 362 releases $a_0$ to cell 367, while delay 372 releases $c_0$ to cell 377. Also, at i=1 $a_1$ and $c_1$ are input to cells 365 and 375, respectively. At i=2, cell 365 receives $a_2$, cell 367 receives $a_1$ as its $q_i$ and receives $a_0$ as its $p_i$ input. Thus, cell 365 generates a term $a_2 \bar{h}_3$ and cell 367 generates $(a_1 + a_0)\bar{h}_1$. These outputs are sent to adder/controller 380 but are held for one clock cycle before being summed with the outputs of cells 375, 377 and 379. At i=2, the outputs of cells 375, 377 and 379 are ignored by adder/controller 380.

At i=3, $c_3$ is input to cell 375, cell 377 receives $c_2$ from the delay 372, cell; 379 receives as propagated input $c_i$, and cell 377 receives as its propagated input $c_0$. Thus, cell 375 generates the term $c_3 \bar{g}_5$, cell 377 generates the term $(c_0 + c_2)^* \bar{g}_3$, and cell 379 generates $c_1 \bar{g}_1$. These outputs are received by adder/controller 380 which adds the i=3 outputs of cells 375, 377 and 379 with the latched, i=2 outputs of cells 367 and 367 from the previous clock cycle. Hence, adder/controller 380 generates the second output (the first odd output) $x_1 \bar{h}_1 a_0 + \bar{h}_1 a_1 + \bar{h}_3 a_2 + \bar{g}_3 c_0 + \bar{g}_3 c_2 + \bar{g}_5 c_3 + \bar{g}_1 c_1$.

Thus, for each clock cycle i, after i=3, (the fourth clock cycle), adder/controller 380 receives the current outputs of cells 375, 377 and 379 and adds them to the previous clock cycle's outputs of cells 365 and 367. Additionally, adder/controller 380 receives the current clock's outputs of cells 365 and 367 holding them until the next clock cycle.

FIGS. 13 and 15 show the complexity necessary to compute the DWT and inverse DWT. In an image processing chip, for instance, the circuitry should be capable of both the forward and inverse DWT. In addition to implementing biorthogonal spline filters for reducing and simplifying the forward and inverse DWT as shown in FIGS. 13 and 15, the invention also provides for an integrated architecture performing both.

Figure 16:
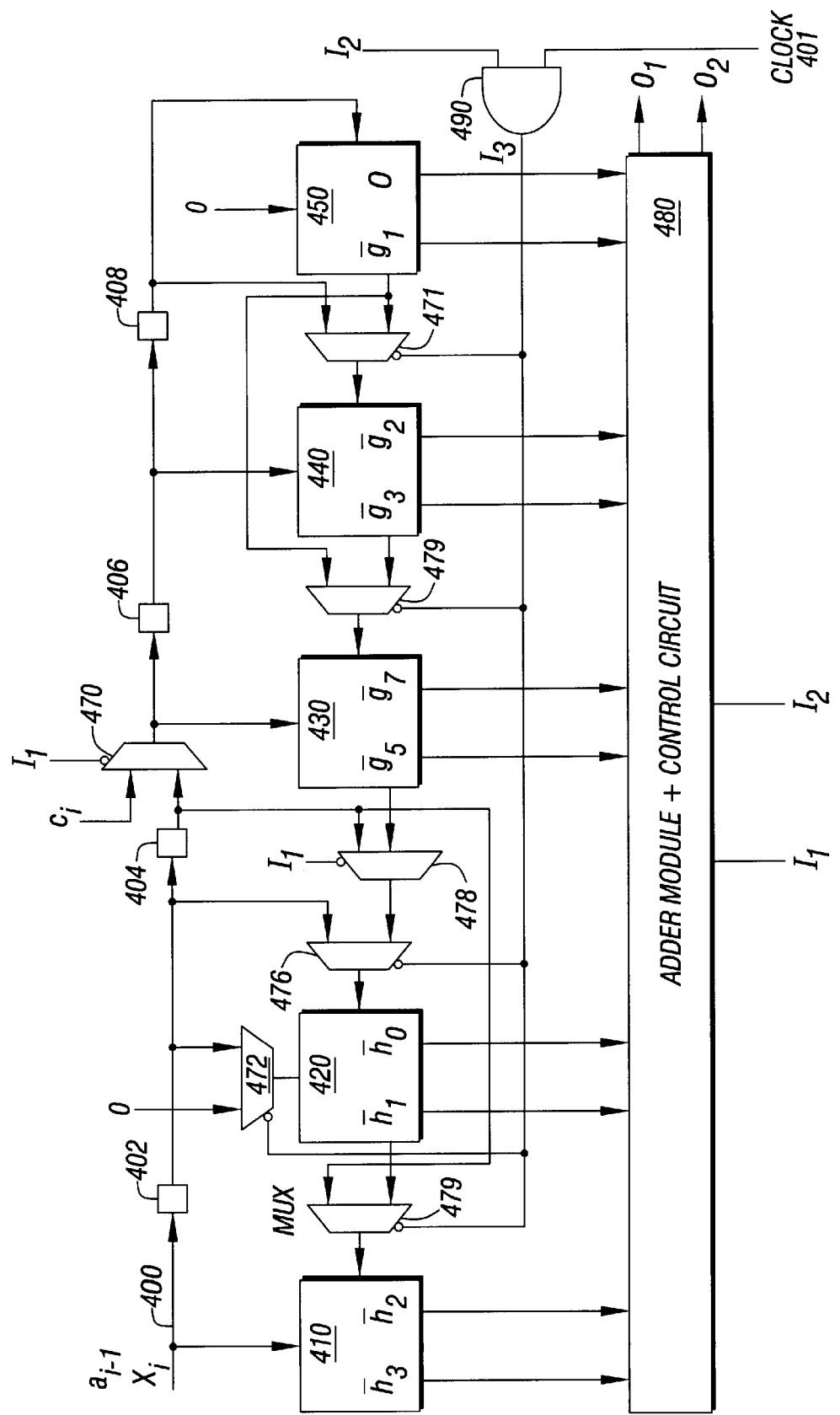
FIG. 16 is a block diagram of a unit to perform both forward and reverse wavelet transformations.
Figure 17:
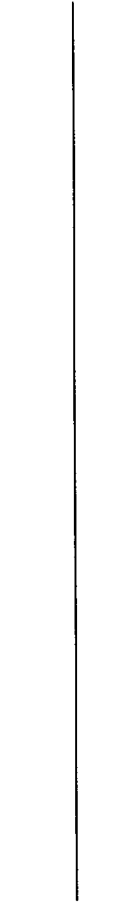
FIGS. 17, 18, 19, 20, 21 and 22 illustrate waveforms of signals of the unit of FIG. 16 when the unit operates in a forward transformation mode.
Figure 18:
Figure 19:
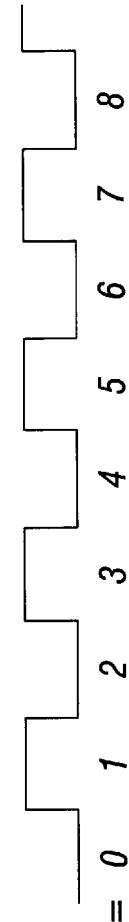
Figure 20:
Figure 21:
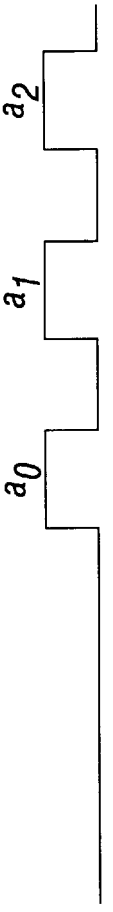
Figure 22:
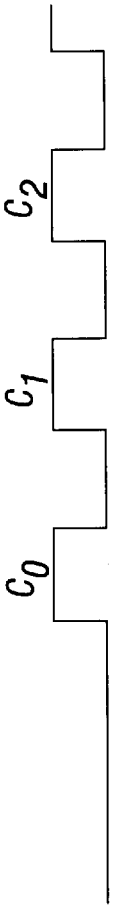

Referring to FIG. 16, in some embodiments, a single integrated systolic architecture may be used for both the forward Discrete Wavelet Transform. The expressions described for the inverse DWT and forward DWT above are implemented in one integrated architecture. Thus, the description of FIG. 16 will concentrate on the architecture rather than mathematical properties which make an integrated architecture possible, since these properties have already been described.

FIG. 16 shows four control signals, a clocking signal 401, a selector signal $I_1$, selector signal I2 and signal I3. $O_1$ and $O_2$ are generated by an adder module and control circuit 480. Five processing cells—410, 420, 430, 440 and 450—each have an adder and multiplier (and registers storing the two coefficients). Each cell has the coefficients shown stored in registers or other such devices (e.g., $\bar{h}_3$ and $\bar{h}_2$ for cell 410). Input line L is coupled via multiplexers and delays to each of the processing cells. The integrated architecture has a delay element 402, multiplexer (MUX) 472, delay element 404, MUX 476, MUX 470, delay element 406, MUX 471 and delay element 408 coupled to line 400. Also shown are a MUX 478, MUX 479, MUX 474, an input line 400, and two output lines $O_1$ and $O_2$.

The control line $I_1$ and $I_2$ are both at a low logic level when the architecture is to function as a forward DWT circuit. During the forward DWT, the input line 400 is sending values corresponding to input samples prior to decomposition. Delay elements 402, 404, 406 and 480 hold samples from the input line 400 for one clock and then release then on the next clock. For MUX 478 and 470, the select line/control signal $I_1$. When $I_1=0$, MUX 470 selects line 400 rather than the input $c_i$ and MUX 478 selects the propagated input from cell 430. For MUX 472, 474, MUX 476, MUX 479 and MUX 471, $I_3$ is the select line or control signal.

When $I_3$ is low (0), MUX 472 selects input line 400, MUX 474 selects the propagated input from cell 420, MUX 476 selects the input from the output of MUX 478, MUX 479 selects the propagated input output by cell 440 and MUX 471 the propagated input output by cell 450. In the forward DWT mode, therefore, the circuit functions similarly to unit 77. Even though there are nine (both high-pass and low-pass), forward DWT filter coefficients and nine inverse DWT filter coefficients, due to the symmetry properties discussed above, the architecture can be simplified to a total of nine coefficients (both low and high pass). With only nine coefficients, only five basic processing cells such as that shown in FIG. 14, are needed to compute the forward and inverse DWT on the integrated architecture.

In the inverse DWT computation, as described above, two input sequences $a_i$ and $c_i$ generate one output sequence $x_i$ which is the reconstructed original sample. However, odd and even numbered outputs are computed separately, and observed on alternating clock cycles. Thus, in FIG. 16, the output $x_{2j+1}$, representing the odd-numbered outputs is observed on the $O_1$ terminal, and the even-numbered outputs are observed on the $O_2$ terminal. For the inverse DWT, $I_1$ and $I_2$ are both set to one. When the clock cycle is low, $I_3$, after a certain delay, is also low (since $I_2$ is high, the output of AND gate 490 ($I_3$) is also high, subject to the propagation delay through gate 490).

When $I_3$ is high, MUX 471 selects input line 400, MUX 479 selects the propagated input output by cell 450, MUX 476 selects the input line 400 as does MUX 474, and MUX 472 selects 0. In the inverse DWT mode, line 400 now propagates $a_{i-1}$ rather than $x_i$. In inverse DWT mode, $I_1=1$ (is always high), and as a result, MUX 470 selects the input $c_i$ and MUX 478 selects the input line 400 (after delay element 404). Utilizing these control signals and multiplexers, the architecture of FIG. 14 is capable of functioning as an inverse DWT (see FIG. 13) or a forward DWT (see FIG. 15). No complex "scheduling" of input and intermediate outputs is required as in traditional architectures and for every clock, an output is produced at terminals $O_1$ and $O_2$.

Referring to FIGS. 17, 18, 19, 20, 21 and 22, the $I_1$ control signal is set to 0 for all clock cycles during the forward DWT mode. Also, the $I_2$ control signal is set to 0 for all clock cycles in the forward DWT mode. A clock signal is generated by a clocking mechanism wherein the first half of the first clock cycle is represented by an i value of 0 (low state) and the second half of the first clock cycle by an i value of 1 (high state). The first half of the second clock cycle is represented by an i value of 2. The clock signal is input to an AND gate along with the $I_2$ signal which generates an output signal $I_3$. Since $I_2$ is always 0 for all clock cycles, $I_3$ is also always 0 during the forward DWT mode. Output terminal $0_1$ does not show a valid output until the first half of the third clock cycle, when i=4, whereupon $0_1$ returns a value $a_0$. In the second half of the third clock cycle, at i=5, the output terminal $0_1$ does not return a valid value for the output terminal $0_2$ returns a valid value for $c_1$. Neither of the output terminals $0_1$ or $0_2$ return a valid value until i=3, whereupon output terminal $0_2$ returns $c_0$. Starting with the second half of the second clock cycle (i=3), the output terminals $0_1$ and $0_2$ alternatively produce valid values with $O_1$ producing the sequence $a_n$ and $0_2$ producing the sequence $c_n$.

Referring to FIGS. 23, 24, 26, 26, 27 and 28, in the inverse DWT mode, the control signal $I_1$ is always set to 1 as is the control signal $I_2$. $I_2$ and the clocking signal are both input to an AND gate to generate the control signal $I_3$. Due to the delay of propagating through the AND gate, the signal $I_3$ is not coincident with the clocking signal, but is slightly delayed on its trailing edge. Since the even and add reconstructed output sequences computed from the inverse DWT are very different in characteristic (see FIG. 13 and associated description) the odd numbered outputs $x_1$, $X_3$, $x_5$, etc. are observed on output terminal $O_1$, whereas the even numbered output sequences $x_0$, $X_2$, $X_4$, etc. are observed on output terminal $O_2$. When $I_3$ is high, the output terminal $O_2$ generates the even numbered output terms for the sequence for the reconstructed input sequence and, when $I_3$ is low, the output terminal $O_1$ generates the odd numbered outputs of the reconstructed input sequence. As described earlier, the first valid output $x_0$ is observed on terminal $O_2$ only starting with the second half of the second clock cycle, where i=3. On the next half clock cycle at i=4, output terminal $O_1$ generates a valid term $x_1$, while the output terminal $O_2$ produces an invalid value. Thus, on alternating half clock cycles starting with i=3, the output terminals $O_1$ and $O_2$ combined generate the entire reconstructed input sequence $x_n$.

Figure 29:
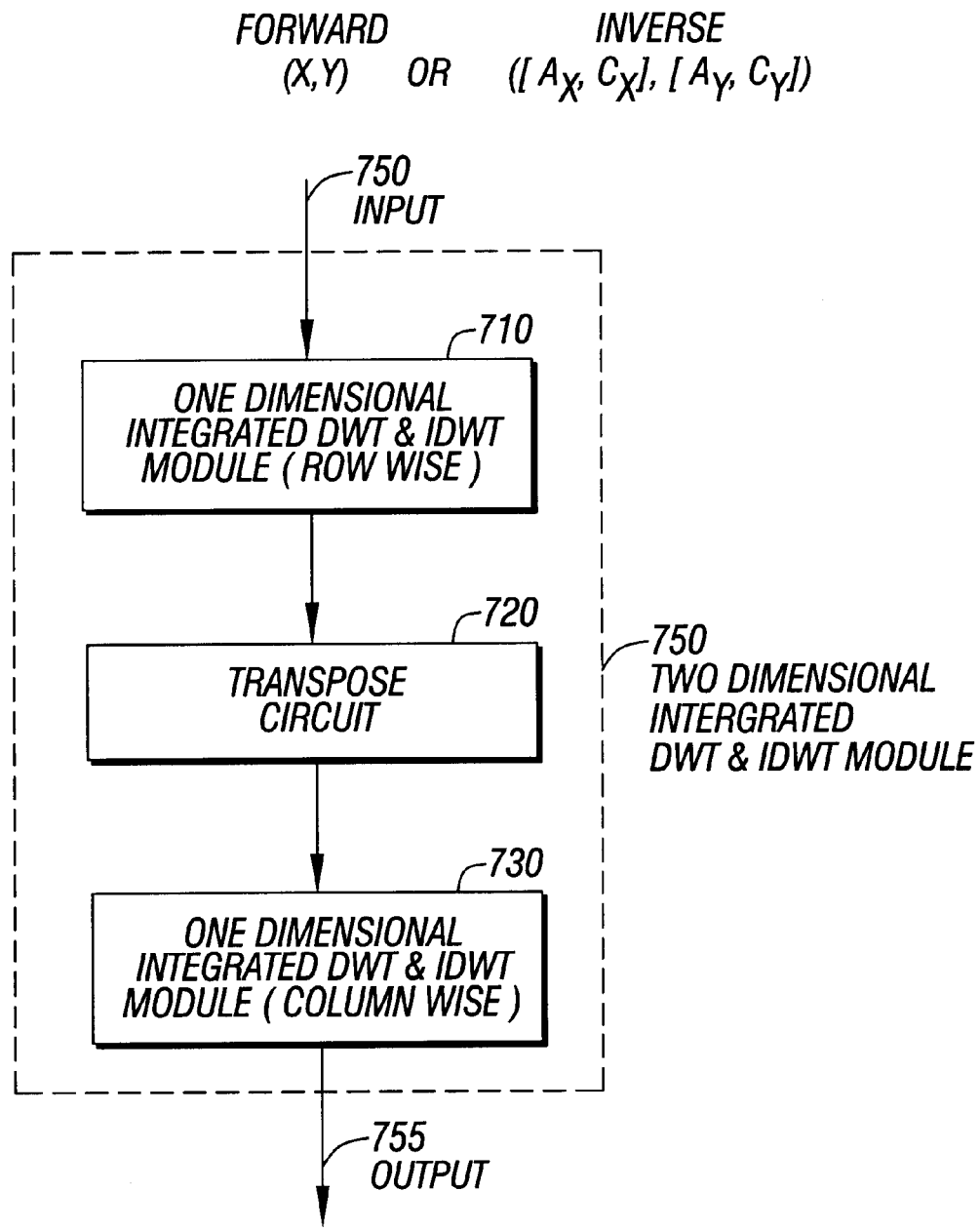
FIGS. 29 and 30 are flow diagrams illustrating operation of the unit of FIG. 16.

Referring to FIG. 29, the two-dimensional integrated module 700 is the extension of the one-dimensional integrated architecture of FIG. 16 for a two-dimensional case, such as an image compression. Within the integrated module 700 a row-wise one-dimensional integrated module 710 and a column-wise one-dimensional integrated module 730. Each of these integrated modules operate similar to the integrated architecture shown in FIG. 13, in that they are both capable of constructing a forward Wavelet Transform for a single input sequence x and the inverse Discrete Wavelet Transform for reconstructing the input sequence x based upon high-frequency sub-band inputs and low frequency sub-band inputs. A transpose circuit 720 is coupled between the integrated module 710 and the integrated module 730 to rearrange the data by transporting the matrix.

In the forward DWT case, the input 750 is a single input sequence which is indexed by x and y coordinates. In the forward case, this input 750 is transformed by the two-dimensional integrated module 700 into an output 755 which consists of a low frequency sub-band output sequence A which is indexes by its x and y coordinates (shown as $A_x$ and $A_y$ in FIG. 29) and a high frequency sub-band output sequence C also indexed by its x and y coordinates (shown as $C_x$ and $C_y$ in FIG. 29). In the inverse DWT case, the integrated module 700 receives via input 750 a low frequency sub-band input sequence A indexed by its x and y coordinates and a high frequency sub-band input sequence C also indexed by its x and y coordinates. This input 750 in the inverse DWT case generates an output 755 which is a single output sequence which consists of the reconstructed input sequence indexed by both its x and y coordinates. For image compression, the forward DWT case corresponds to the compression of the image while the inverse DWT case corresponds to the decompression of the image.

Figure 30:
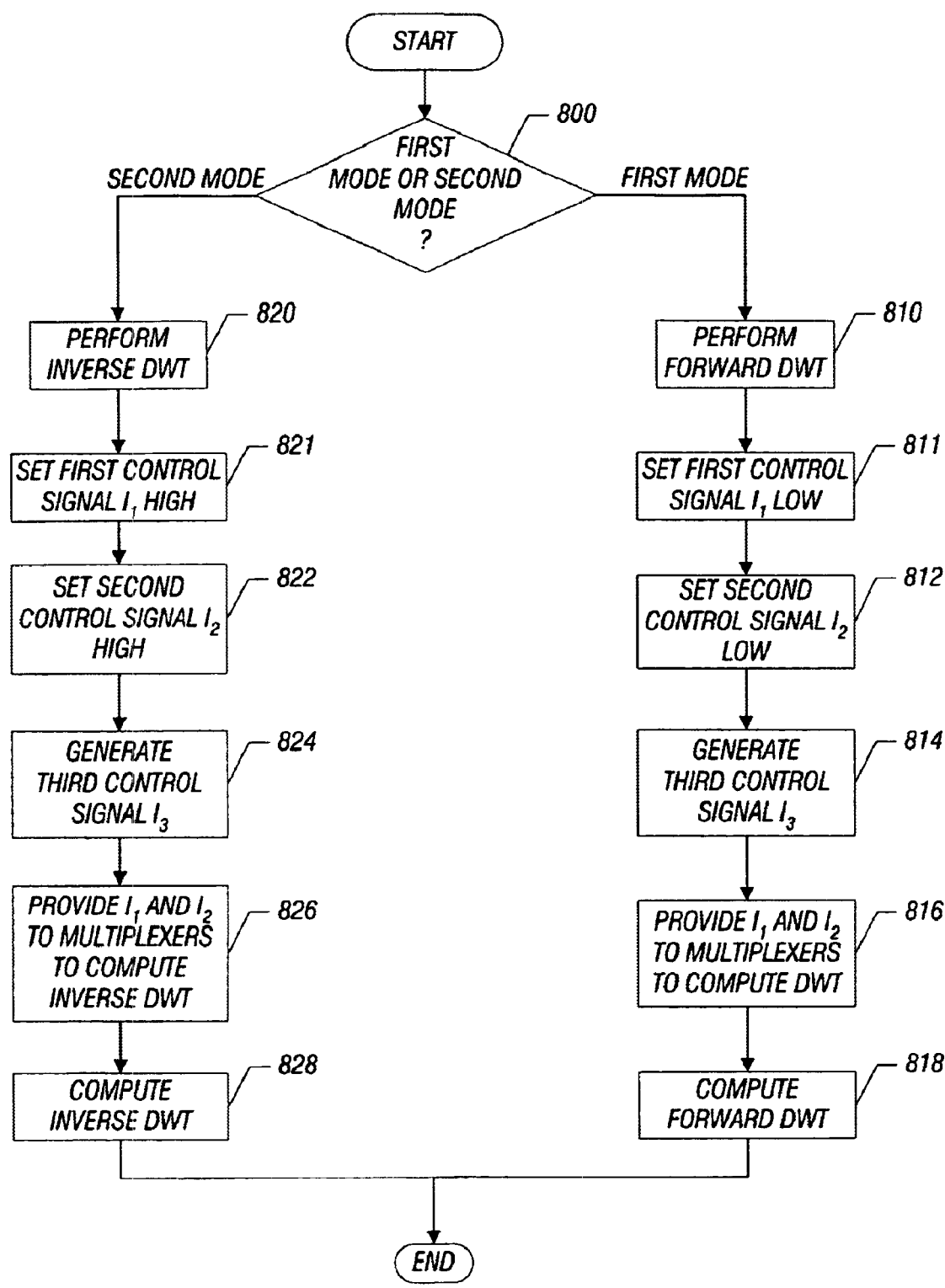

Referring to FIG. 30, a flowchart of the basic method of integrating forward and inverse DWT in a single architecture includes determining (block 800) whether a first mode, the forward DWT, is required or the second mode, the inverse DWT, is required. In an image processing application, some switch/toggle may perform this selection based on whether compression or decompression is to be performed.

If the first mode is selected, the architecture will begin to perform the forward DWT (block 810). For the forward DWT mode, a first control signal $I_1$ is set low or a value of 0 (block 811). A second control signal 12 is also set low or a value of 0 (block 812). Next, the second control signal is propagated as one input of a two input AND gate, while the clocking signal itself is the other input. This generates a third control signal 13 (block 814). The first and third control signals, $I_1$ and $I_3$, are provided to multiplexers to select the appropriate inputs of those multiplexers when computing the forward DWT (block 816). Finally, according to block 818, the forward DWT is computed to completion.

If the second mode is selected, the architecture begins to perform the inverse DWT (block 820). For the inverse DWT mode, a first control signal $I_1$ is set high or a value of 1 (block 821). A second control signal $I_2$ is also set high or a value of 1 (block 822). Next, the second control signal is propagated as one input of a two input AND gate, while the clocking signal itself is the other input. This generates a third control signal $I_3$ (block 824). The first and third control signals, $I_1$ and $I_3$, are provided to multiplexers to select the appropriate inputs of those multiplexers when computing the inverse DWT (step 826). Finally, according to block 828, the inverse DWT is computed to completion.

The above flowchart shows that by multiplexing inputs and controlling the selection of the multiplexed inputs depending on the mode selected, a single architecture can be used to compute both the forward and inverse DWT. Not shown in the flowchart of FIG. 30, is that the computing steps 818 and 828 may utilize biorthogonal spline filter coefficients as a basis for computing the forward and inverse DWT, respectively. Also, symmetry properties of these filter coefficients are used to reduce the output equations for compute both inverse and forward DWT, with these coefficients being supplied to processing cells of the architecture. The multiplexers allow selective coupling of the processing cells in order to compute the forward and inverse DWT.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method comprising
   generating first difference frames;
   compressing the first difference frames to form compressed difference frames;
   decompressing the compressed difference frames to form decompressed difference frames; and
   using the decompressed difference frames in the generation of the first difference frames.

2. The method of claim 1, wherein the act of compressing comprises:
   filtering the first difference frames.
3. The method of claim 2, wherein the act of compressing comprises:
   quantizing data associated with the first difference frames.
4. The method of claim 1, wherein the act of decompressing includes:
   dequantizing data associated with the compressed difference frames.
5. The method of claim 1, wherein the compressed difference frames include data indicative of frequency sub-band images, and wherein the act of decompressing includes using the data to generate the decompressed difference frames.
6. The method of claim 1, further comprising:
   entropy encoding data associated with the first difference frames.
7. The method of claim 1, further comprising:
   serially transmitting data associated with the first difference frames to a computer.
8. A digital imaging system comprising:
   a pixel sensor array to generate captured frames indicative of captured pixel images;
   an adder circuit to combine the captured frames with decompressed difference frames to generate first difference frames;
   a compression circuit to compress the first difference frames to form compressed difference frames; and
   a decompression circuit to decompress the compressed difference frames to form the decompressed difference frames.
9. The digital imaging system of claim 8, wherein the compression circuit comprises:
   a transformation circuit to spatially filter the first difference frames to generate data indicative of frequency sub-band images.
10. The digital imaging system of claim 9, wherein the compression circuit further comprises:
   a quantization circuit to quantize data associated with the first difference frames.
11. The digital imaging system of claim 8, wherein the decompression unit comprises:
   a dequantization circuit to dequantize data associated with the compressed difference frames.
12. The digital imaging system of claim 8, wherein the compressed frames include data indicative of frequency sub-band images, and wherein the decompression unit comprises:
   an inverse transformation circuit to use the data to generate the decompressed frames.
13. The digital imaging system of claim 8, further comprising:
   an entropy encoder circuit to encode data associated with the first difference frames.
14. The digital imaging system of claim 8, further comprising:
   a serial bus;
   a serial bus interface to generate signals on the serial bus that indicate the first difference frames; and
   a computer to decode the signals to receive the first difference frames.
15. The digital imaging system of claim 14, wherein the computer further uses the first difference frames to display representations of the captured pixel images.
16. A camera comprising:
   a pixel sensor array to generate captured frames indicative of captured pixel images;
   an adder circuit to combine the captured frames with decompressed difference frames to generate first difference frames;
   a compression circuit to compress the first difference frames to form compressed difference frames;
   a decompression circuit to decompress the compressed difference frames to form the decompressed difference frames; and
   an interface circuit to communicate signals indicative of the first difference frames to circuitry external to the camera.
17. The camera of claim 16, wherein the compression circuit comprises:
   a transformation circuit to spatially filter the first difference frames to generate data indicative of frequency sub-band images.
18. The camera of claim 17, wherein the compression circuit further comprises:
   a quantization circuit to quantize the data.
19. The camera of claim 16, wherein the decompression unit comprises:
   a dequantization circuit to dequantize data of the compressed frame.
20. The camera of claim 16, wherein the compressed frame includes data indicative of frequency sub-band images, and wherein the decompression unit comprises:
   an inverse transformation circuit to use the data to generate the decompressed frames.
21. The camera of claim 16, further comprising:
   an entropy encoder circuit coupled to the interface circuit to encode the first difference frames.
22. The camera of claim 16, wherein the circuitry external to the camera comprises a serial bus.

* * * * *